3,681,181
COMPRESSION MOLDING OF WOODEN ARTICLES

Harold L. Hameister, Richfield Springs, N.Y., and Erwin Reitter, Jr., Wilmington, Del., assignors to Remington Arms Company, Inc., Bridgeport, Conn.
Original application Oct. 25, 1968, Ser. No. 770,527, now Patent No. 3,562,376. Divided and this application June 5, 1970, Ser. No. 57,400
Int. Cl. B32b 1/04
U.S. Cl. 161—41           1 Claim

ABSTRACT OF THE DISCLOSURE

A wooden article having a curved and varying cross-section and a process of compression molding the article to substantially final dimensions and surface smoothness. The wooden article, e.g., a gun stock, is shaped or formed to within about 10% of its final dimensions and then is treated with a plastic primer means so as to fill up the surface pores and cracks. The primed gun stock is then compressed by heated dies under pressure to mold portions, e.g., the two side faces, to final dimensions. The dies are then cooled while the stock is still held under compression and then the dies are released and the stock removed. The sequence is repeated with a second set of dies which are adapted to compression mold the non-molded portions and to overlap the original molded surface so as to blend in the final surface and thus avoid any flashing. The stock can also be checkered during one of the compression molding operations.

---

This is a division of application Ser. No. 770,527, filed Oct. 25, 1968, now Pat. No. 3,562,376.

This invention relates to the finishing of wooden articles in general and more particularly to the compression molding of elongated wooden articles which have a varying curved cross-section, such as a gun stock or gun fore-ends.

Heretofore, a great deal of work in making finished gun stocks has been done manually, which with rising labor costs has meant a disproportionate cost of the stock as compared to other gun parts which can be made automatically by sophisticated machinery. The sanding, scuffing, filling, wiping, drying, checkering, etc. operations which have traditionally been associated with the making of gun stocks have not kept pace with the revolution in automatic machines underway in industry. Some improvement in this area was achieved with the advent of machine impressed checkering, as explained in U.S. Pat. No. 3,231,455 issued to J. D. Campbell III et al., on Jan. 25, 1966. However, the improved impressed checkering described in Campbell '455 still required substantial manual labor in sanding, etc. the rough formed stock to the finished dimensions and smoothness prior to impressing the checkering design on the stock or fore-ends.

In addition to the elimination of various manual operations, the method of compression molding the rough shaped stock to final dimensions and smoothness has other advantages, some of which will now be discussed.

Obviously, a major advantage is economy. By eliminating expensive hand labor, it will cost less per unit manufactured. Secondly, the dimensions and finish with this method are more uniform than can be expected from hand labor. The dies and machine can be expected to produce substantially the same article each time and experience, skill, distractions, and other variables found to affect the quality of products made by hand labor are substantially decreased or eliminated. The product itself is improved since the molded surface is more durable, is approximately two times as resistant to damage as an unmolded article, and has improved wood graining.

Checkering can be made an integral part of the molding dies so that checkering would be done simultaneously with the molding. This would eliminate current depth control and non-uniformity of stocks. Also, "game" or other scenes could be molded on the sides of stocks or fore-ends. Less lacquer or other finishing coatings would be required due to the improved molded finish, i.e., closing of the wood grains by the replacement of natural resins coming to the surface. The normal open grain always encountered on a sanded stock is for all practical purposes closed on the molded stocks.

The surface hardness of the molded stock is substantially better than the conventional sanded stock. Shore Scleroscope test readings taken indicate a Shore hardness of about 21 for stocks in their natural state and a Shore reading of about 48 on a molded stock.

In any molding operation where an article having a continuous, smooth, curved surface is to be molded to final dimension, the problem of "flashing" arises. The "flashing" is the excess material which is extruded out of the area between the multiple dies. To compression mold an article such as a gun stock requires at least two die elements and where there are two movable die elements, there will be some opening between the dies through which excess moldable material (in this case, wood) will be extruded to form a flashing. Obviously, this flashing is undesirable from a cost viewpoint as well as an aesthetic viewpoint. The present process is designed to eliminate such flashing.

Accordingly, it is an object of this invention to compression-mold a curved wooden article to final dimensions and smoothness without the necessity of removing a flashing.

It is another object of this invention to compression-mold a curved wooden article to final shape and impress a design thereto at the same time.

It is still another object of this invention to provide a wooden article having a superior, harder, more dent and scratch resistant surface finish.

It is yet another object of this invention to provide a process of machine finishing a gun stock wherein the end product is uniform in dimension and finish.

Other objects and advantages of the invention will become obvious after reading the following description and claims with the accompanying drawings in which:

Figure 1:
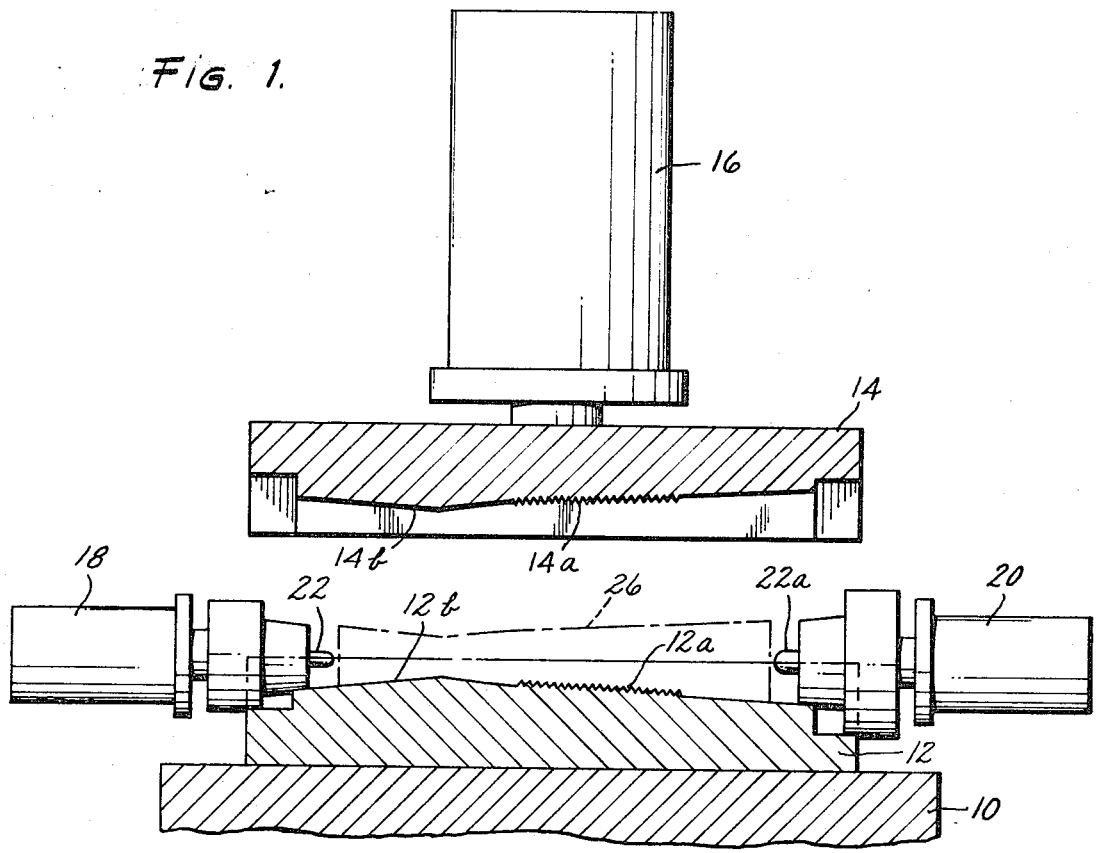
FIG. 1 is a front, elevational, schematic view of a master press machine.

Referring to the drawings, FIG. 1 shows a table 10 on which is mounted a lower die section 12 and an upper die section 14. The lower die is stationary while the upper die is vertically movable by means of hydraulic cylinder 16, or any other well-known press means. Obviously, either or both of the die sections can be made to be movable. Both dies are heated, as will be explained later, and are complementary so that when in the closed position, they define a predetermined profile which approximates the desired ultimate profile of the molded gun stock.

Although the drawings disclose the compression-molding of a gun stock, it must be mentioned that the present invention can be used to mold other elongated wood articles which have curved profiles.

Also mounted on table 10 on opposite dies of the stationary die section 12 are hydraulic cylinder means 18 and 20 which actuate longitudinally movable supporting pins 22, 22a, and 22b which are adapted to engage locating holes 24, 24a, and 24b in the ends of the gun stock or workpiece 26 to position and support the gun stock while the heated die sections 16 and 22 are moved into compressing position.

Die sections 12 and 14 are heated in any well-known manner preferably by providing chamber 28 in the die sections having passageways therein which are connected to some source (not shown) of heating medium, e.g., steam. Provisions must be made, however, to change the heating system over quickly to a cooling system wherein the same passageways which carry steam to heat the dies must be adapted to carry water to cool the dies at predetermined points in the molding cycle. The heating and cooling systems are not shown in detail since the specific heating and cooling means are not pertinent to this invention.

Figure 2:
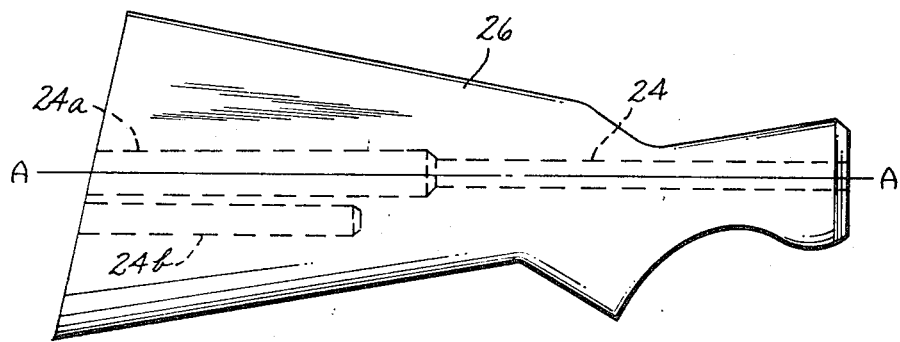
FIG. 2 is a side, elevational view of a typical type of gun stock which can be compression-molded by the present invention.

FIG. 2 shows a typical gun stock 26 which can be molded and finished in accordance with the present invention. It is to be noted that at any point along the stock, the cross-sectional area varies but that in each case the surface is curved. Obviously, this is a complex molding operation. The grain of the wood runs in a longitudinal direction generally parallel to the center line A—A shown in FIG. 2.

Figure 3:
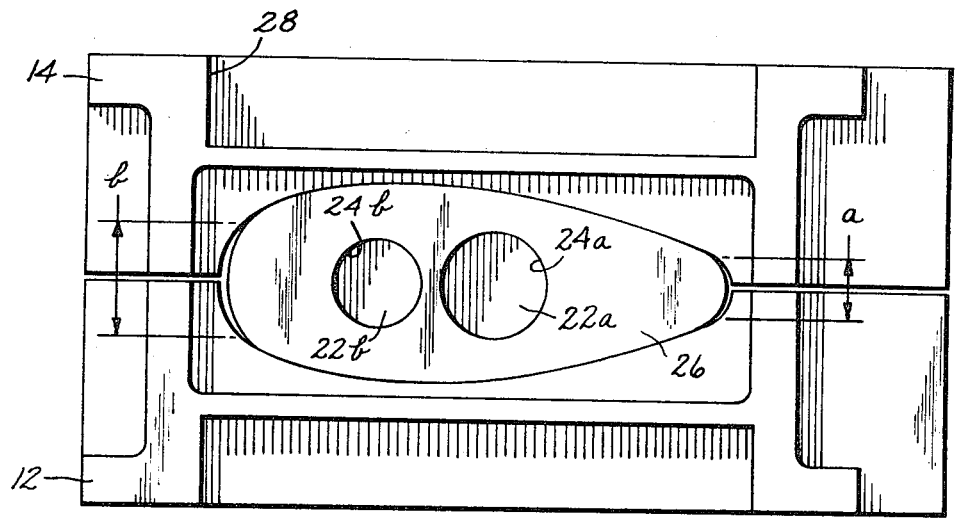
FIG. 3 is an enlarged, cross-sectional view of a pair of master dies in closed position about a gun stock.

FIG. 3 shows the heated dies 12 and 14 in a closed or compressing position about the workpiece 26. The entire upper die 14 can be moved up and down or it can be hinged so that only one end of the die section moves up and down. In the master press, as shown in FIG. 3, the lower die section, i.e., 12, remains stationary while the upper die section 14 only moves upwardly to provide access to the die cavity.

Also shown in FIG. 3 are locating holes 24a and 24b in the gun stock in which supporting pins 22a and 22b are positioned. By using these pins and holes, the gun stock is precisely located and firmly supported for the compressing operation of die sections 12 and 14. The increments shown as a and b in FIG. 3 indicate the portions of the stock which are *not* compression-molded in the first or master press molding operation. Although two locating holes and pins are shown, it should be obvious that any number can be used.

Figure 4:
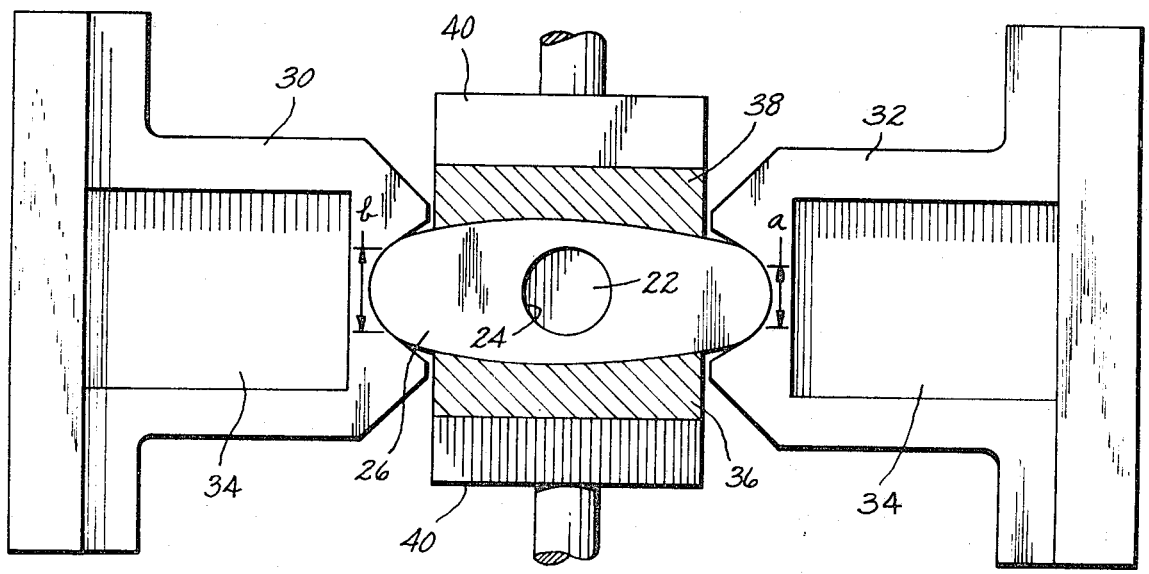
FIG. 4 is an enlarged, cross-sectional view of a pair of profile dies in closed position about a gun stock.

FIG. 4 shows the second or profile press molding operation. In this operation, the heated die sections 30 and 32 move in and out in a longitudinal direction instead of the vertical direction as shown in FIG. 3. Obviously, the process can be modified to have the dies move in any direction depending on the position of the gun stock as long as the dies compression-mold the non-molded portions shown in FIG. 3 as a and b. Die sections 30 and 32 also have chambers 34 formed therein including passageways (not shown) through which either a heating medium or a cooling medium can flow to either heat or cool the die sections, as will be explained later.

The gun stock 26 while undergoing pressure in the molding operation of the second or profile press operation must also be precisely located and firmly supported. This is accomplished by positioning internal positioning pins 22, 22a, and 22b in locating holes 24, 24a, and 24b and by using movable elastomeric corsets 36 and 38 to grip the stock firmly.

It is to be noted that FIG. 4 does not show the corresponding portion of the gun stock being molded in the profile press (FIG. 4) that is shown in the master press operation in FIG. 3. Not only is the cross-sectional area of the stock shown to be different but FIG. 4 shows a view to the right of the half-way point along the stock whereas FIG. 3 shows a view to the left of the half-way mark. (See FIG. 2). This explains the single locating hole 24 in FIG. 4 and the double structure 24a and 24b in FIG. 3. The elastomeric corsets 36 and 38 are secured to any conventional type of retractable ram means 40 which move up and down in FIG. 4 while the positioning pins 22, 22a, and 22b move in and out perpendicular to the plane of the drawing.

It can be seen from FIG. 4 that the die sections 30 and 32, when in the closed position, engage the stock 26 so as to overlap the portions of the stock which were molded previously during the master press operation. The increments shown in FIG. 4 as a and b define the non-molded portions from the first or master press operation.

It should be appreciated that the surface of one or more of the dies can be formed with a pattern which forms an impression either positive or negative of the pattern to be pressed in the wooden workpiece 26. Preferably, if impressed checkering is to be performed simultaneously with the molding operation, the checkering is performed during the first or master press operation. FIG. 1 shows patterns 12a and 14a formed on surfaces 12b and 14b.

The actual process will now be described in more detail. One of the main objectives was to develop a method for press forming stocks to final shape and size, with or without checkering, or other decoration, directly from the mechanical shaping operation without manual sanding. This process was further improved by immersing the carved stock in a liquid sealer prior to the press forming operation, thereby eliminating the wood fill operation. The press formed stock then may be processed through lacquer, or other suitable material, resulting in a superior finish at a significant reduction in cost over present methods.

The first step in the process is to shape the gun stock by any well-known shaping or carving means to as close to the final shape and size as economically possible, preferably to within about ±0.010" of final dimensions. The rough stock, at ambient temperature, is then immersed into a liquid sealer for about 10 minutes, during which time a certain amount of sealer fluid enters the pores and cracks of the wood.

The suitable primer fluid must be a plastic coating material, must not discolor under the temperatures and pressures involved, must be moldable, must be elastic so as to permit the wood to move without crazing or cracking, must be able to penetrate into the wood, must have a water-white color, must be non-yellowing or non-aging, must be mar-resistant, and must be basically compatible with the wood material.

A typical liquid sealer or primer which is suitable for use in the process comprises about 8.0–9.7% alkyd-urea resins on a solids basis, about 5.0–6.3% vinyl resin on solids basis, about 58.0–48.3% aromatic diluents, and about 29.0–35.7% solvents. Preferably, the primer comprises about 8.5% alkyd-urea resins on solids basis, about 5.5% vinyl resin on solids basis, about 54.8% aromatic diluents, adn about 31.2% of solvents.

Although a vinyl primer is preferred, urethane has been used successfully. Such solvents as toluol, xylol, V. M. & P. naphtha, normal butyl alcohol, and methyl isobutyl ketone are suitable as the non-solid ingredients. The preferred primer must be catalyzed and it does have a pot life. If the percentage of solids exceeds the maximum limit, the primer sealer will not penetrate into the pores and cracks of the wood. If the viscosity or the percentage of solids is too low, there is less retention of the solids in the cavities and pores of the wood.

Returning now to the process, after dipping the stock in the primer for about 10 minutes, the primed stock is then withdrawn from the primer liquid and air dried at ambient temperature to get rid of the solvents in the primer liquid. Then the stock goes into a heated chamber, preferably at a temperature of about 125°–130° F., for a sufficient period of time to give the desired hard and moisture-resistant coating. Obviously, the temperature of the heated chamber will determine the time necessary for the primed stock to remain in the heated chamber before the desired results are achieved.

The primed stock is then immersed in the primer liquid for the second time. The stock is just dipped in and out as compared to the longer period of immersion for the first primer application.

After the second dipping, the stock is air dried as before and then put into a second heated chamber which has humidity control. The preferred temperature again is about 125°–130° F. and the relative humidity is held to about 40–60%. The relative humidity eliminates the surface cracks caused by putting one coating on top of the other. The moisture in the wood stock during this process must be held under about 12%.

The next step in the process is the master press operation. In this step the major portions of the two lateral sides of the stock are compressed or molded to final dimensions. (See FIG. 3.) The checkering may also be done during this step. The top and bottom edges, indicated as b and a on FIG. 3, are not formed by the master press but are done during the subsequent profile press (see FIG. 4).

The temperature of the dies 16 and 22 is increased to a preferred temperature of about 275°–300° F. by any well-known heating means, preferably by directing steam—or other heating medium—through passages (not shown) in chamber 30 in the dies. When the desired temperature is reached, the workpiece or stock (at ambient temperature) is inserted into the dies. The die sections are moved relative to one another until they both contact the wood. Supporting pins 22, 22a, and 22b are then brought in to engage the holes 24, 24a, and 24b of the stock after which the top die closes to pressure-engaging or compression molding locked position. After about 1–4 minutes, the heating medium is shut off and a cooling medium, e.g. water, is introduced into the finned area of the dies. This quickly brings the temperature of the dies down to under about 150° F., whereupon the dies are opened a little, the pins 22, etc. come out, and the dies are opened all the way and the workpiece is withdrawn.

It is possible to vary the temperature of the dies below the preferred range of 275°–300° F. at the expense of additional cost and time. For example, if the production schedule (and economics) will tolerate about a 10-minute cycle instead of the preferred 1–4 minute cycle, the temperature of the dies may be lowered to about 250° F. With a minimum temperature of slightly over 150° F., about a 30-minute cycle would be required. The temperature to which the dies are cooled is also largely a matter of economics. The temperature must be lowered to under about 150° F. since this temperature is about the lower limit at which molding of the wood will take place. If the economics will permit cooling to room temperature, the process would still be operable.

The heat from the dies must be transferred to the wood to cause the lignin and cellulose to become semi-fluid. The sides of the stock are reduced from almost nothing to about .170" total (both sides) or preferably from about 0% to about 10% total reduction in certain areas. The top and bottom edges of the stock, i.e., portions a and b, bulge out slightly after the first pressing in the master dies 12 and 14. However, after the second, or profile pressing, the dimension of the stock in these areas is reduced proportionately.

If the dies open immediately at the elevated temperature, i.e., preferably about 275°–300° F., without cooling off first, the wood would pop back out. When the dies are held closed and the temperature is reduced to below about 150° F., the lignin and the cellulose in the wood are set and locked into place.

The next step after removing the stock from the master press is to profile the stock in the profile press. This step completes the molding or forming of the stock which was begun in the master press. The master press also checkers the stock and compresses the major portions of the sides of the stock and left strips of bulged-out non-molded portions on the top and bottom of the stock. The profile dies are adapted to compress these bulged-out, non-molded end portions of the stock and actually overlap the part of the sides which were compressed by the master dies.

After the partially molded stock is withdrawn from the master press, it is placed in the profile press wherein the profile dies 30 and 32 have been preheated to a temperature of preferably about 260°–300° F. The stock is placed on the bottom elastomeric corset 36 after which the internal positioning pins 22, 22a and 22b are brought in. After the pins and the corsets are in position and the temperature is up to the required temperature, the heated dies 30 and 32 are brought together to compress the non-molded portions of the wood. After about 1 to 4 minutes of pressure, the heating medium, e.g., steam, is shut off and cooling medium, e.g., water, is introduced to the die cooling chamber. The dies remain closed until the temperature is lowered to below about 150° F., whereupon the dies 30 and 32 are retracted, the pins 22, etc. are withdrawn, and finally the elastomeric corsets 36 and 38 are withdrawn.

Additional steps, not associated with the present invention, may be performed after the stock is withdrawn from the profile press to add a special finish or some other miscellaneous feature.

What is claimed is:

1. An elongated, compression molded, wooden article having a curved exterior surface when viewed in cross-section and having the grain of the wood run generally longitudinally of the elongated article, said exterior surface having a surface hardness of at least two times the Shore Scleroscope reading of a conventional sanded wooden article, plastic sealer means on the exterior surface of said article and entering into the pores and cracks of the wood, said sealer penetration into the wood depending on the grain and texture of the wood but varying up to about 1/16" on the side portions of the elongated article and up to about 1/8" on the end grain, and a design pressed into the wood under suitable pressure and temperature conditions to provide stable hills and valleys, said hills and valleys having a composition of cellulose, lignin, and sealer, said plastic sealer means comprising alkyd-urea resins and one of the group of moldable, elastic, mar-resistant, non-yellowing plastic coating materials consisting of vinyl resin and urethane resin.

References Cited

UNITED STATES PATENTS

| | | | |
|---|---|---|---|
| 2,300,760 | 11/1942 | Amigo | 264—296 |
| 2,708,296 | 5/1955 | Soehner | 161—124 |
| 3,231,455 | 1/1966 | Campbell et al. | 161—124 |

DOUGLAS J. DRUMMOND, Primary Examiner

U.S. Cl. X.R.

161—124